United States Patent [19]
Beyer et al.

[11] Patent Number: 6,070,123
[45] Date of Patent: May 30, 2000

[54] PROCESS FOR A VEHICLE CONTROL AND INFORMATION SYSTEM

[75] Inventors: Rolf Beyer, Bad Honnef; Gerhard Fleck, Meckenheim; Bernd Guenther, Niederkassel, all of Germany

[73] Assignee: Detemobil Deutsche Telekom Mobilnet GmbH, Germany

[21] Appl. No.: 08/973,562

[22] PCT Filed: Mar. 12, 1996

[86] PCT No.: PCT/DE96/00438

§ 371 Date: Dec. 2, 1997

§ 102(e) Date: Dec. 2, 1997

[87] PCT Pub. No.: WO96/31858

PCT Pub. Date: Oct. 10, 1996

[30] Foreign Application Priority Data

Apr. 6, 1995 [DE] Germany ........................... 195 12 528
Dec. 21, 1995 [DE] Germany ........................... 195 47 574

[51] Int. Cl.$^7$ ................................. G06F 165/00
[52] U.S. Cl. ................. 701/209; 701/202; 701/206; 701/208; 701/211; 340/988; 340/990
[58] Field of Search ................. 701/2, 33, 201, 701/202, 206, 207, 208, 210, 211; 455/466, 7, 39; 340/988, 990

[56] References Cited

U.S. PATENT DOCUMENTS 5,719,918 2/1998 Serbetciouglu et al. ............... 455/466
5,812,123 9/1998 Rowe et al. ........................... 345/327

FOREIGN PATENT DOCUMENTS 3440657 5/1986 Germany ........................... G08G 1/00
4118603 12/1991 Germany ........................... G08G 1/0962
4139581 6/1993 Germany ........................... G08G 1/0968
4214067 11/1993 Germany ........................... G08G 1/127

OTHER PUBLICATIONS

Cardy, "Was Sie mit unserem Karteninformationssystem alles machen können", (1993).
Bethmann et al., "AVLS—ein System zur automatischen Positionbestmmung von Fahrzeugen", pp. 129–135 (1994).

*Primary Examiner*—William A. Cuchlinski, Jr.
*Assistant Examiner*—Gertrude Arthur
*Attorney, Agent, or Firm*—Baker & Maxham

[57] ABSTRACT

A process for a vehicle control and information system in which data and traffic-related information are transmitted by means of at least one radio-transmission system between a vehicle and a central unit. A data-processing unit in the central unit and/or a data-processing unit in the vehicle are used to calculate at least one route, and the route data is transmitted by means of the data-transmission system between the vehicle and the central unit. The data-processing unit in the central unit and/or the data-processing unit in the vehicle simulate in real time the motion of the vehicle, the real-time simulation being carried out both in the vehicle-mounted data-processing unit and in the data-processing unit in the central unit using signals which are it transmitted over the radio transmission system. The vehicle position in the real-time simulation of the motion of the vehicle is displayed in the vehicle together with additional information relevant to the traffic.

30 Claims, 2 Drawing Sheets

PROCESS FOR A VEHICLE CONTROL AND INFORMATION SYSTEM

BACKGROUND OF THE INVENTION

1. Field of the Invention

The invention concerns a process for a vehicle control and information system, where data and traffic-relevant information are transmitted between a vehicle and a central unit by means of at least one wireless transmission system.

2. Discussion of Prior Art

Various methods and arrangements for vehicle control and information systems have already become known. Two main types of systems can be identified in particular. The first are autarchic navigation systems, where navigation of the vehicle takes place in the navigation system itself. However, this requires that a considerable quantity of route information be loaded and stored on suitable data storage media. Further, access to prevailing current traffic information is impossible with such systems.

An autarchic map information system with navigation and route planning options is known from the company CARDY Karten Informations Systeme GmbH, Mönchengladbach, and was presented in a brochure in October 1993. CARDY is a map information system with a navigation program based on an electronic map database available on a data storage medium in the vehicle. With the help of a GPS system, a so-called "MAP matching" is performed that is, the map detail is matched to the vehicle position thus determined, so that the current location of the vehicle can be displayed permanently on the corresponding map detail. The vehicle position determined by GPS can also be transmitted by wireless transmission to a central unit for the purpose of fleet management, for example. Route planning is also possible on the basis of the maps stored electronically in the vehicle, where the navigation of the vehicle is based on the planned route and the vehicle position is determined by the GPS system.

By the Traffic Message Channel (TMC) method in conjunction with the Radio Data Systems (RDS), coded traffic information is transmitted in addition to the current wireless program. In the vehicle, it is possible to select from the information available that which is of interest for the instantaneous region and direction of travel. In addition to the ongoing need for data processing in the vehicle, no specific, individually coordinated distribution of information is possible with such systems. This can be accomplished by establishing a connection between the vehicle and one or more central information units via bidirectional data transmission systems such as wireless transmission systems. A permanently installed beacon system, where a suitable vehicle device makes contact with a beacon on passing by it, is a way of effecting this result. To provide complete information however, this requires coverage of the area by a network of beacons, which is generally impossible to implement. The area supplied with information is therefore usually limited mainly to densely populated areas.

Furthermore, a bidirectional exchange of information can be achieved by using a wireless transmission system such as a digital GSM network and can be maintained continuously by total coverage through mobile wireless systems.

It is usually desirable to provide the driver only with the specific information concerning his instantaneous location on a certain section of the route and his direction of travel. The System Of Cellular Wireless for Traffic Efficiency and Safety (SOCRATES) is known for this purpose; it filters traffic information transmitted regionally over GSM on the basis of position information and route information available in the vehicle and displays it for the driver. However, this automatically leads to the need for positioning devices for continuous determination of the position of the vehicle, and this is associated with a corresponding cost and technical complexity.

SUMMARY OF THE INVENTION

A primary purpose of the present invention is to guarantee a bidirectional flow of information between the vehicle and a central control and information unit and a steady supply of current information for the driver—in a framework tailored specifically for the driver's position—where this framework can preferably be specified and influenced by the driver. The least possible technical complexity on the part of the vehicle in particular, and thus inexpensive use of the system by the driver, are the goals of the invention.

According to the invention, position data and additional traffic-relevant information are displayed to the driver, especially control information such as current recommended turns based on the calculated route. At least one travel route is calculated in either the central data processing unit or the vehicle's processing unit, or both, using an algorithm based on known average travel times (route resistance). The route can be calculated in particular on the basis of information entered by the driver himself on a data entry unit and transmitted to the data processing units. This is followed by transmission of route data over the wireless broadcast system, so that the same routes are in both data processing units. On this basis, ideally the central data processing unit as well as the vehicle's data processing unit simulate in real time the path of the vehicle. However, a real-time simulation can also take place only in the central data processing unit or only in the vehicle's processing unit, which results in a reduced expense for the second data processing unit and thus permits cost savings accordingly. In this case, only transmission of the vehicle position, which is derived from the real-time simulation, to the second data processing unit is required, at least at regular intervals.

Any real-time simulation can take place completely independently in a data processing unit without requiring access to vehicle operation parameters or position parameters. Thus with respect to the real-time simulation, the data processing unit represents a closed system that requires as input data only the minimum of one travel route calculated and in which the real-time simulation is started by a start signal. Thus a virtual vehicle runs through a virtual trip in the respective data processing unit that corresponds to the actual trip of the real vehicle on the real route. Ideally, the virtual trips and the real trip are completely identical. Deviations between the trips are covered by synchronization or plausibility tests.

For the case of a real-time simulation in the vehicle's data processing unit as well as in the central processing unit, there is a synchronization of the real-time simulations over the wireless transmission system, which takes place only at the start of the simulations or at regular intervals, for example, depending on the demands regarding the accuracy of the system and minimization of the signal, but the synchronization of real-time simulations is performed at least when the simulation is corrected by the driver, for example, by a data entry unit in the vehicle. In this embodiment of the invention, vehicle position information can be requested in both systems at any time, but this information must be coordinated over the wireless transmission system only occasionally. In addition to a drastically reduced expense of sending signals over the wireless transmission system, this guarantees that route-based traffic information, specifically the vehicle position and navigation information, will be made available to the driver even when there are temporary interruptions in wireless transmission. In addition, this process, which is based on individual trip routes, permits controlled distribution of information over a bidirectional wireless transmission system to the respective vehicle, in particular current information concerning the location of the vehicle. The vehicle position information required for the correlation can be obtained easily from the real-time simulation. A direct determination of the actual current vehicle position through the additional expense of positioning systems is thus unnecessary. A plausibility check and any required correction of the vehicle position in the simulation can be performed by the driver himself by making direct entries in the vehicle.

The scope of the invention concerns especially refinements of this idea which include a digital mobile wireless network according to the GSM standard. GSM networks already provide extensive coverage for mobile systems, so that a continuous supply of information to vehicles is another advantage.

One embodiment of this invention provides for the driver himself to be able to use a data entry unit in the vehicle to enter information on the trip which is then used as the basis for the virtual trip route. This concerns in particular the start of the trip route and the destinations, preferred segments of the route and any information on detours. The trip route is then displayed by an optical and/or acoustic method in the vehicle and the driver is given an opportunity to make corrections on the trip route, in particular on the instantaneous position of the vehicle, on a data entry terminal. The vehicle control system thus not only presents the driver with a continuous supply of information but also offers him the possibility of adapting the process to his individual wishes at any time and intervening in the system in a controlling manner.

It is advisable here to synchronize the virtual trip route in the central data processing unit with the virtual trip route in the vehicle's data processing unit at least when data are entered on the data entry terminal in the vehicle. The expense of sending signals over the wireless transmission system can also be minimized and an adjustment is performed only when actually necessary.

The vehicle control system is preferably supplemented by additional current traffic-relevant information. On the basis of the location of the vehicle, which is obtained from the virtual trip route, the central unit selects specifically current information such as the condition of the route, construction sites and traffic density, among others, concerning the route traveled by the vehicle and/or one or more alternate routes, and it relays this information to the vehicle.

This thus yields the advantage of a dynamic traffic control that takes into account instantaneous conditions. The driver is provided with information that is selected on an individual basis and concerns only that part of the roadway system that is of interest for the given driver. The specific selection of information according to the location of the vehicle is simplified by the fact that the information about the location of the vehicle is already constantly available from the virtual trip route.

Another embodiment provides for the traffic control system to provide the driver with additional information and request services. In addition to providing any desired traffic and route information, additional services such as hotel reservations, booking flights, etc., may also be provided here.

This invention can be combined in an advantageous manner with a positioning system for verification of the position information. Positioning systems such as the Global Positioning System (GPS) are available for this purpose. After transmission of the position data to the data processing unit in the vehicle, the position information is compared with the vehicle position in the virtual trip. If there are deviations above a range of tolerance, the vehicle position is corrected on the virtual route in the real-time simulation.

For this embodiment it is also advantageous to perform a synchronization of the virtual trip routes in the central data processing unit and the vehicle's data processing unit at least after correcting the vehicle position in the virtual trip.

BRIEF DESCRIPTION OF THE DRAWING

The objects, advantages and features of this invention will be more clearly perceived from the following detailed description, when read in conjunction with the accompanying drawing, in which.

DETAILED DESCRIPTION OF THE PREFERRED EMBODIMENTS

Figure 1:
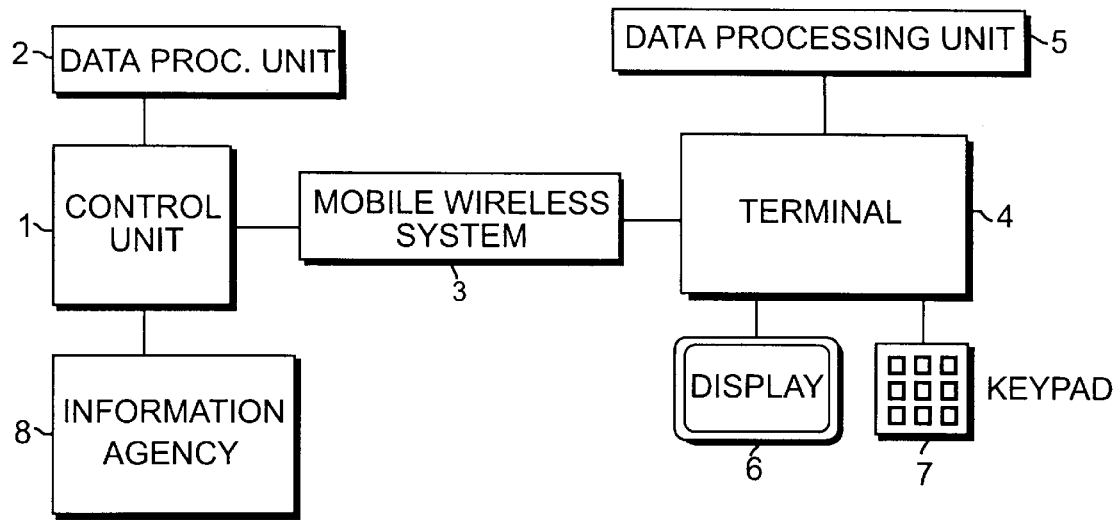
FIG. 1 is a block diagram of the central unit and the components in the vehicle, which are connected by mobile radio system, in accordance with the present invention.
Figure 2:
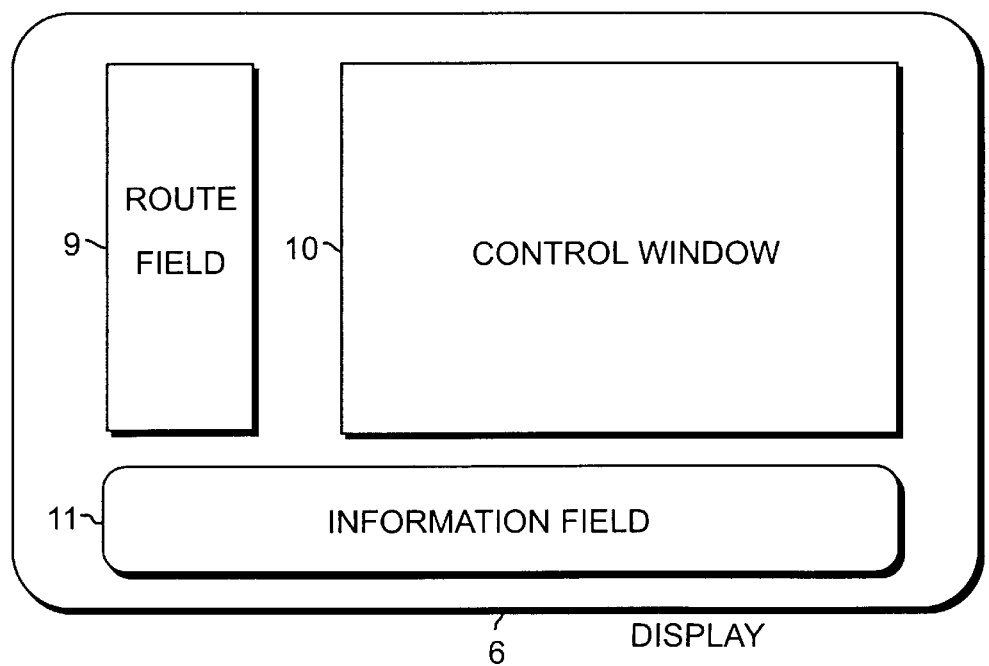
FIG. 2 shows an optical display device of FIG. 1 for information in the vehicle.
Figure 3:
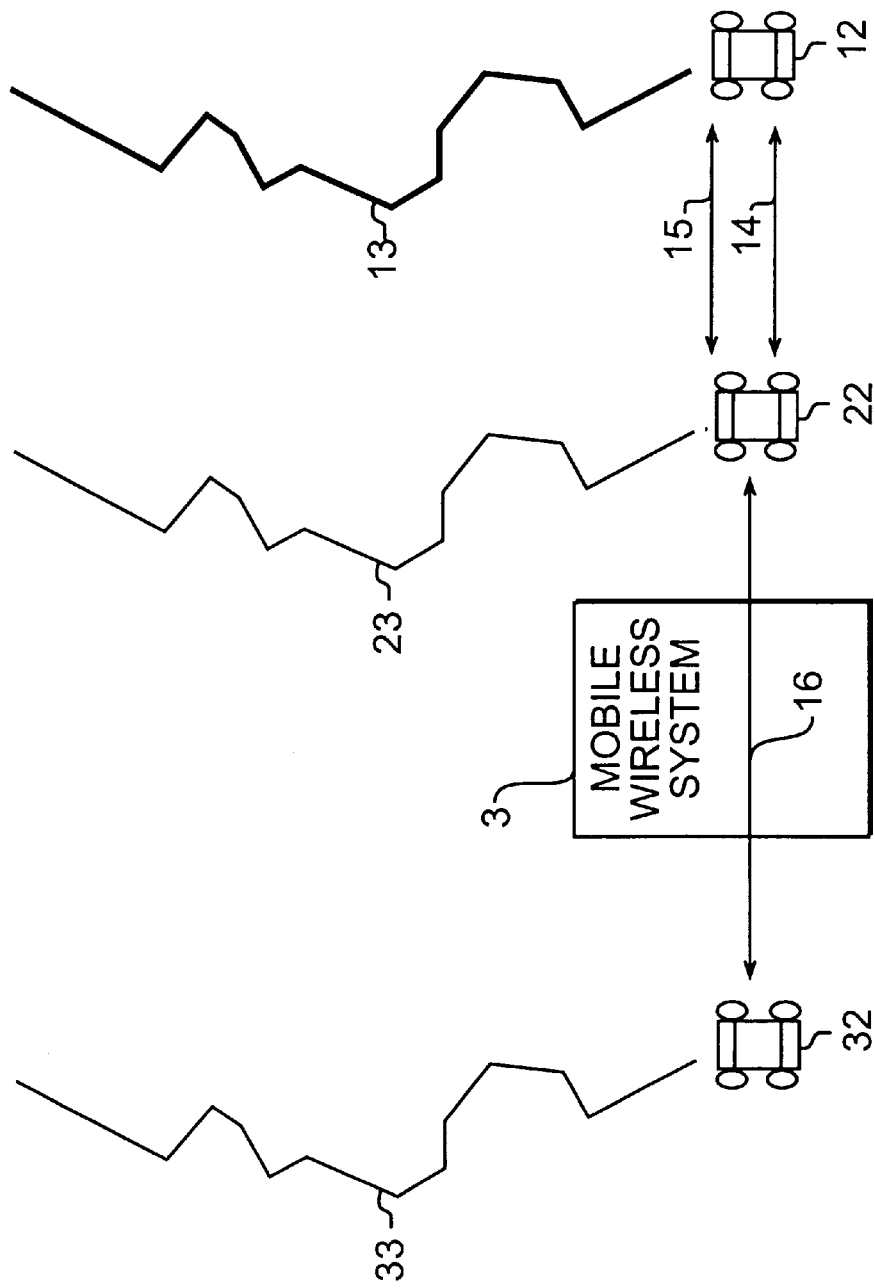
FIG. 3 illustrates how trip routes are adjusted by the system of FIG. 1.

With reference now to the drawing figures, terminal 4 in vehicle 12 is connected to keypad 7 as the data entry device by means of which the driver enters information such as the starting location, the destination and optionally preferred routes (for example, "by way of Hannover") at the start of his trip in the vehicle.

There are two possibilities for calculating the best standard route:

1. Calculating the route in terminal 4 in the vehicle—the system in the vehicle relays the data on the calculated route to central unit 1 (ZE) via mobile wireless system 3; or 2. Calculating the route in central unit 1—the vehicle's system transmits the information entered to central unit 1 via mobile wireless system 3. Central unit I calculates the standard route, which forms the basis for real trip route 13 of real vehicle 12, plus optionally alternate routes as well, and it sends this information to the vehicle's terminal 4 over mobile wireless system 3.

The driver signals to the system that he is beginning a trip by setting a start time and entering it on keypad 7. Then a virtual trip route 23, 33 is started in data processing unit 5 in the vehicle and in data processing unit 2 in central unit 1 and is synchronized at 16 by the mobile wireless system 3. On the basis of the calculated trip route as well as the route resistance of each segment of trip route 23, 33, each of the data processing units then simulates trip 23, 33 of virtual vehicle 22, 32 on a route with a course that is identical to the standard route. This takes place as a completely independent real-time simulation that is independent of real trip 13, without inquiries regarding any other external parameters such as operating information or position information on real vehicle 12. On display 6, the current portion of trip route 23 simulated in the vehicle appears in route field 9. The changes in position are displayed to the driver on display 6. The instantaneous position of virtual vehicle 22 on virtual route 23, which is ideally identical to that of real vehicle 12 on real route 13, are emphasized in a suitable manner, for example, by a striking color bar.

In addition, a control window 10 displays local information and control information such as freeway intersections and exits and information such as "take next exit (no. 47)," etc.

When there are deviations between the location indicated by the system on display 6 and the actual position of the vehicle, the driver can make a correction 14 on keypad 7. Correction 14 in the vehicle's position is sent to data processing units 2, 5 where virtual trip route sequences 23, 33 are adjusted by a new synchronization 16 via mobile wireless system 3. If the driver interrupts the trip, he signals this to the vehicle system and the central system by making an appropriate entry on the keypad. On resuming the trip, he notifies the system accordingly.

If a GPS receiver is available in vehicle 12, an optional verification 15 of the position of virtual vehicle 22 in virtual trip 23 simulated in the vehicle is possible. A position inquiry is performed to determine the actual position of real vehicle 12, and the position information is compared with the current position information on virtual vehicle 22 in virtual trip 23. If the position information shows a deviation in excess of a predefined tolerance range, the position of virtual vehicle 22 on route 23 is corrected and then trip route 33 in the central processing unit is adjusted 16.

From virtual trip route 33, the central processing unit knows the position and direction of travel of virtual vehicle 32. Ideally, this information will correspond to the current information on real vehicle 12, which is guaranteed by adequate adjustment of trip routes 13, 23, 33. Current traffic reports supplied by information agency 8 to the central processing unit are assigned individually to each subscriber on the basis of trip route and direction of travel and according to the vehicle position information. The information filtered in this way is displayed in information field 11 on driver's display 6. The information thus displayed is updated automatically. The information may consist of traffic situation reports or local warnings, such as "Warning, fog with less than 50 m visibility in area . . . "; "Driver approaching in wrong lane, please keep to the far right . . . "; "Slippery ice on freeway bridge"; for example.

If traffic problems occur on the planned route, the driver can request an individual recommended detour from the central processing unit. The driver can then read this alternate route on display 6.

The driver can also terminate the information process completely at any time on the keypad. Finally, the driver may also request services and information directly from the central processing unit, such as weather information for a certain region, information on hotels, telephone, address information, etc. These services and information may be made available directly by the central processing unit or access to the corresponding service providers may be provided by the central processing unit, either through the latter or directly via the service providers. Additional applications would include making hotel, railroad or plane reservations as well as transacting financial and stock business.

What is claimed is:

1. A process for a vehicle control and information system, where trip and traffic-relevant information are transmitted between a vehicle and a central unit by means of at least one wireless transmission system, the vehicle and the central unit each having a data processing unit, the process comprising the steps of:

calculating at least one trip route in the central data processing unit or in the vehicle data processing unit;

transmitting the trip information between the vehicle and the central unit over the at least one wireless transmission system;

simulating the trip by the vehicle in real-time in the central data processing unit and/or in the vehicle data processing unit by having a virtual trip route, which corresponds to the actual trip route of the vehicle, running in the respective data processing unit, where the real-time simulation runs completely independently of the actual trip by the vehicle;

performing a real-time simulation in the vehicle data processing unit as well as in the central data processing unit, the real-time simulations being synchronized by signals that are relayed over the at least one wireless transmission system; and displaying in the vehicle the vehicle position determined by the real-time simulation of the trip as well as additional traffic-relevant information.

2. The process according to claim 1 and comprising the further step of:

selecting by the central unit the additional traffic-relevant information on the basis of the position of the vehicle derived from the real-time simulation and relaying this information to the vehicle via the at least one wireless transmission system.

3. The process according to claim 2, and comprising the further steps of:

entering information regarding the trip, in particular the starting point and destination, on a data entry terminal in the vehicle;

conveying that same information to the data processing units in the vehicle and in the central unit; and forming the basis of the real-time simulation from that information specifying the trip route and the start time of the trip.

4. The process according to claim 3, and comprising the further step of:

correcting the vehicle position in the real-time simulation of the trip on the data entry terminal in the vehicle.

5. The process according to claim 2, and comprising the further step of:

summoning information, especially travel related services information and/or traffic-relevant information, from the vehicle by means of the vehicle control and information system.

6. The process according to claim 2, and comprising the further step of:

correcting the vehicle position in the real-time simulation of the trip on a data entry terminal in the vehicle.

7. The process according to claim 6, and comprising the further step of:

summoning information, especially travel related services information and/or traffic-relevant information, from the vehicle by means of the vehicle control and information system.

8. The process according to claim 1, and comprising the further steps of:

entering information regarding the trip, in particular the starting point and destination, on a data entry terminal in the vehicle;

conveying that same information to the data processing units in the vehicle and in the central unit; and forming the basis of the real-time simulation from that information specifying the trip route and the start time of the trip.

9. The process according to claim 8, and comprising the further step of:

correcting the vehicle position in the real-time simulation of the trip on the data entry terminal in the vehicle.

10. The process according to claim 8, and comprising the further step of:

summoning information, especially travel related services information and/or traffic-relevant information, from the vehicle by means of the vehicle control and information system.

11. The process according to claim 1, and comprising the further step of:

correcting the vehicle position in the real-time simulation of the trip on a data entry terminal in the vehicle.

12. The process according to claim 11, and comprising the further step of:

summoning information, especially travel related services information and/or traffic-relevant information, from the vehicle by means of the vehicle control and information system.

13. The process according to claim 1, and comprising the further step of:

summoning information, especially travel related services information and/or traffic-relevant information, from the vehicle by means of the vehicle control and information system.

14. The process according to claim 1 wherein the at least one wireless transmission system is a digital mobile wireless system.

15. A process for a vehicle control and information system, where trip and traffic-relevant information are transmitted between a vehicle and a central unit by means of at least one wireless transmission system, the vehicle and the central unit each having a data processing unit, the process comprising the steps of:

calculating at least one trip route in the central data processing unit or in the vehicle data processing unit;

transmitting the trip information between the vehicle and the central unit over the at least one wireless transmission system;

simulating the trip by the vehicle in real-time in the central data processing unit and/or in the vehicle data processing unit by having a virtual trip route, which corresponds to the actual trip route of the vehicle, running in the respective data processing unit, where the real-time simulation runs completely independently of the actual trip by the vehicle;

performing a real-time simulation in the vehicle data processing unit as well as in the central data processing unit, the real-time simulations being synchronized by signals that are relayed over the at least one wireless transmission system;

displaying in the vehicle the vehicle position determined by the real-time simulation of the trip as well as additional traffic-relevant information;

determining the actual position of the vehicle by means of the data processing unit in the vehicle;

comparing the actual position of the vehicle with the current position of the vehicle in the real-time simulation of the trip by means of a positioning system, in particular through a wireless positioning system; and correcting the position of the vehicle in the real-time simulation of the trip if a set tolerance limit for the deviation of the actual vehicle position from the current vehicle position in the real-time simulation of the trip is exceeded.

16. The process according to claim 15, and comprising the further step of:

selecting by the central unit the additional traffic-relevant information on the basis of the position of the vehicle derived from the real-time simulation and relaying this information to the vehicle via the at least one wireless transmission system.

17. The process according to claim 16, and comprising the further steps of:

entering information regarding the trip, in particular the starting point and destination, on a data entry terminal in the vehicle;

conveying that same information to the data processing units in the vehicle and in the central unit; and forming the basis of the real-time simulation from that information specifying the trip route and the start time of the trip.

18. The process according to claim 16, and comprising the further step of:

correcting the vehicle position in the real-time simulation of the trip on a data entry terminal in the vehicle.

19. The process according to claim 17, and comprising the further step of:

correcting the vehicle position in the real-time simulation of the trip on the data entry terminal in the vehicle.

20. The process according to claim 15, and comprising the further steps of:

entering information regarding the trip, in particular the starting point and destination, on a data entry terminal in the vehicle;

conveying that same information to the data processing units in the vehicle and in the central unit; and forming the basis of the real-time simulation from that information specifying the trip route and the start time of the trip.

21. The process according to claim 20, and comprising the further step of:

correcting the vehicle position in the real-time simulation of the trip on the data entry terminal in the vehicle.

22. The process according to claim 15, and comprising the further step of:

correcting the vehicle position in the real-time simulation of the trip on a data entry terminal in the vehicle.

23. A process for a vehicle control and information system, where trip and traffic-relevant information are transmitted between a vehicle and a central unit by means of at least one wireless transmission system, the vehicle and the central unit each having a data processing unit, the process comprising the steps of:

calculating at least one trip route in the central data processing unit or in the vehicle data processing unit;

transmitting the trip information between the vehicle and the central unit over the at least one wireless transmission system;

simulating the trip by the vehicle in real-time in the central data processing unit and/or in the vehicle data processing unit by having a virtual trip route, which corresponds to the actual trip route of the vehicle, running in the respective data processing unit, where the real-time simulation runs completely independently of the actual trip by the vehicle;

performing a real-time simulation in the vehicle data processing unit as well as in the central data processing unit, the real-time simulations being synchronized by signals that are relayed over the at least one wireless transmission system;

displaying in the vehicle the vehicle position determined by the real-time simulation of the trip as well as additional traffic-relevant information; and synchronizing the real-time simulation of the trip in the central data processing unit with the real-time simulation of the trip in the vehicle data processing unit when:
data concerning the trip route sequence is entered on a data input terminal in the vehicle; and/or
the vehicle position on the virtual trip is corrected by the vehicle data processing unit.

24. The process according to claim 23, and comprising the further step of:
selecting by the central unit the additional traffic-relevant information on the basis of the position of the vehicle derived from the real-time simulation and relaying this information to the vehicle via the at least one wireless transmission system.

25. The process according to claim 24, and comprising the further steps of:
entering information regarding the trip, in particular the starting point and destination, on a data entry terminal in the vehicle;
conveying that same information to the data processing units in the vehicle and in the central unit; and
forming the basis of the real-time simulation from that information specifying the trip route and the start time of the trip.

26. The process according to claim 25, and comprising the further step of:
correcting the vehicle position in the real-time simulation of the trip on the data entry terminal in the vehicle.

27. The process according to claim 24, and comprising the further step of:
correcting the vehicle position in the real-time simulation of the trip on a data entry terminal in the vehicle.

28. The process according to claim 23, and comprising the further steps of:
entering information regarding the trip, in particular the starting point and destination, on a data entry terminal in the vehicle;
conveying that same information to the data processing units in the vehicle and in the central unit; and
forming the basis of the real-time simulation from that information specifying the trip route and the start time of the trip.

29. The process according to claim 28, and comprising the further step of:
correcting the vehicle position in the real-time simulation of the trip on the data entry terminal in the vehicle.

30. The process according to claim 23, and comprising the further step of:
correcting the vehicle position in the real-time simulation of the trip on a data entry terminal in the vehicle.

* * * * *